(12) United States Patent
Kennedy, III et al.

(10) Patent No.: US 6,905,424 B2
(45) Date of Patent: *Jun. 14, 2005

(54) GOLF BALL WHICH INCLUDES FAST-CHEMICAL-REACTION-PRODUCED COMPONENT AND METHOD OF MAKING SAME

(75) Inventors: Thomas J. Kennedy, III, Wilbraham, MA (US); Michael John Tzivanis, Chicopee, MA (US); Viktor Keller, Enfield, CT (US); William Risen, Rumford, RI (US)

(73) Assignee: Callaway Golf Company, Carlsbad, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 09/877,600

(22) Filed: Jun. 8, 2001

(65) Prior Publication Data

US 2001/0039220 A1 Nov. 8, 2001

Related U.S. Application Data

(63) Continuation of application No. 09/411,690, filed on Oct. 1, 1999, now Pat. No. 6,290,614, which is a continuation-in-part of application No. 09/040,798, filed on Mar. 18, 1998.

(51) Int. Cl.⁷ .............................................. A63B 37/12

(52) U.S. Cl. ...................................................... 473/378

(58) Field of Search ................................ 473/377, 378, 473/373, 374, 368, 367, 371

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Piechowski |
| 3,264,272 A | 8/1966 | Rees |
| 3,313,545 A | 4/1967 | Bartsch |
| 3,373,123 A | 3/1968 | Brice et al. |

(Continued)

FOREIGN PATENT DOCUMENTS

| | | |
|---|---|---|
| CA | 2137841 | 6/1995 |
| EP | 0589647 | 10/1994 |
| EP | 0630665 | 12/1994 |
| EP | 0637459 | 2/1995 |
| GB | 494031 | 10/1938 |
| GB | 2245580 | 1/1992 |
| GB | 2248067 | 3/1992 |
| GB | 2264302 | 11/1992 |
| GB | 2291811 | 2/1996 |
| GB | 2291812 | 2/1996 |

OTHER PUBLICATIONS

Cytec Industries, Inc., "TMXDI® (META) Sliphatic Isocyanates," brochure, pp. 2–11, Sep. 1994.

Miles Inc., "Engineering Polymers Properties Guide Thermoplastics and thermosets," brochure, pp 2–23, May 1994.

Bayer Corporation, "Engineering Polymers RIM and Part Mold Design," brochure, pp. 1–85, May 1995.

Mobay Corporation, "The Chemistry of Polyurethane Coatings," A General Reference Manual, pp. 2–15.

Primary Examiner—Raeann Gorden

(57) ABSTRACT

Disclosed herein is a golf ball comprising one or more fast-chemical-reaction-produced components, such as a component which comprises a reaction injection molded polyurethane material. A process of making a golf ball by forming at least one core and/or cover component of the ball by mixing two or more reactants that react and form a reaction product with a flex modulus of 1 to 310 kpsi, with a setting time of about 30 seconds or less, the component having a thickness of at least 0.01 inches and a mold release time of 2 minutes or less is also disclosed. In one preferred form of the invention, excess polyurethane from forming golf ball covers is recycled by using it to form golf ball cores.

15 Claims, 4 Drawing Sheets

U.S. PATENT DOCUMENTS

| | | |
|---|---|---|
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |
| 4,248,432 A | 2/1981 | Hewitt et al. |
| 4,272,079 A | 6/1981 | Nakade et al. |
| 4,274,637 A | 6/1981 | Molitor |
| 4,337,946 A | 7/1982 | Saito et al. |
| 4,431,193 A | 2/1984 | Nesbitt |
| 4,442,282 A | 4/1984 | Kolycheck |
| 4,570,937 A | 2/1986 | Yamada |
| 4,582,887 A | 4/1986 | Dominguez et al. |
| 4,590,219 A | 5/1986 | Nissen et al. |
| 4,607,090 A | 8/1986 | Dominguez |
| 4,650,193 A | 3/1987 | Molitor et al. |
| 4,674,751 A * | 6/1987 | Molitor ...................... 473/351 |
| 4,679,795 A | 7/1987 | Melvin et al. |
| 4,688,801 A | 8/1987 | Reiter |
| 4,690,981 A | 9/1987 | Statz |
| 4,695,055 A * | 9/1987 | Newcomb et al. .......... 473/353 |
| 4,714,253 A | 12/1987 | Nakahara et al. |
| 4,762,322 A | 8/1988 | Molitor et al. |
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A | 11/1989 | Newcomb et al. |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,006,297 A | 4/1991 | Brown et al. |
| 5,019,319 A | 5/1991 | Nakamura et al. |
| 5,026,067 A | 6/1991 | Gentiluomo |
| 5,035,425 A | 7/1991 | Edwards |
| 5,045,591 A | 9/1991 | Meyer et al. |
| 5,048,838 A | 9/1991 | Chikaraishi et al. |
| 5,068,151 A | 11/1991 | Nakamura |
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,142,835 A | 9/1992 | Mrocca |
| 5,150,906 A | 9/1992 | Molitor et al. |
| 5,156,405 A | 10/1992 | Kitaoh et al. |
| 5,184,828 A | 2/1993 | Kim et al. |
| 5,187,013 A | 2/1993 | Sullivan |
| 5,197,740 A | 3/1993 | Pocklington et al. |
| 5,219,973 A | 6/1993 | Slack et al. |
| 5,222,739 A | 6/1993 | Horiuchi et al. |
| 5,244,969 A | 9/1993 | Yamada |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,300,334 A | 4/1994 | Niederst et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,324,783 A | 6/1994 | Sullivan |
| 5,330,837 A | 7/1994 | Sullivan |
| 5,334,673 A * | 8/1994 | Wu ........................... 473/378 |
| 5,338,610 A | 8/1994 | Sullivan |
| 5,356,941 A * | 10/1994 | Sullivan et al. ............... 521/96 |
| 5,368,304 A | 11/1994 | Sullivan et al. |
| 5,368,806 A | 11/1994 | Harasin et al. |
| 5,387,750 A | 2/1995 | Chiang |
| 5,403,010 A | 4/1995 | Yabuki et al. |
| 5,439,227 A | 8/1995 | Egashira et al. |
| 5,480,155 A | 1/1996 | Molitor et al. |
| 5,482,285 A | 1/1996 | Yabuki et al. |
| 5,484,870 A | 1/1996 | Wu |
| 5,490,673 A | 2/1996 | Hiraoka |
| 5,490,674 A | 2/1996 | Hamada et al. |
| 5,492,972 A | 2/1996 | Stefani |
| 5,553,852 A | 9/1996 | Higuchi et al. |
| 5,586,950 A | 12/1996 | Endo |
| 5,628,699 A | 5/1997 | Maruko et al. |
| 5,668,239 A | 9/1997 | Nodelman et al. |
| 5,674,137 A | 10/1997 | Maruko et al. |
| 5,688,191 A | 11/1997 | Cavallaro et al. |
| 5,692,974 A * | 12/1997 | Wu ........................... 473/377 |
| 5,730,665 A | 3/1998 | Shimosaka et al. |
| 5,733,206 A | 3/1998 | Nesbitt et al. |
| 5,733,207 A | 3/1998 | Sullivan et al. |
| 5,733,428 A | 3/1998 | Calabria et al. |
| 5,739,247 A | 4/1998 | Lesko et al. |
| 5,739,253 A | 4/1998 | Nodelman et al. |
| 5,750,580 A | 5/1998 | Mayer et al. |
| 5,759,676 A * | 6/1998 | Cavallaro et al. ........... 428/215 |
| 5,779,561 A | 7/1998 | Sullivan et al. |
| 5,779,562 A * | 7/1998 | Melvin et al. ............... 473/373 |
| 5,779,563 A | 7/1998 | Yamagishi et al. |
| 5,783,293 A | 7/1998 | Lammi |
| 5,792,008 A | 8/1998 | Kakiuchi et al. |
| 5,797,808 A | 8/1998 | Hayashi et al. |
| 5,800,284 A | 9/1998 | Sullivan et al. |
| 5,803,831 A | 9/1998 | Sullivan et al. |
| 5,810,678 A | 9/1998 | Cavallaro et al. |
| 5,813,923 A * | 9/1998 | Cavallero et al. ........... 473/373 |
| 5,816,937 A | 10/1998 | Shimosaka et al. |
| 5,820,488 A | 10/1998 | Sullivan et al. |
| 5,820,489 A | 10/1998 | Sullivan et al. |
| 5,820,491 A | 10/1998 | Hatch et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |
| 5,919,100 A | 7/1999 | Boehm et al. |
| 5,919,862 A | 7/1999 | Rajagopalan |
| 5,922,252 A | 7/1999 | Stanton et al. |

| | | |
|---|---|---|
| 5,929,189 A | 7/1999 | Ichikawa et al. |
| 5,935,021 A | 8/1999 | Kashiwagi et al. |
| 5,947,842 A | 9/1999 | Cavallaro et al. |
| 5,947,843 A | 9/1999 | Calabria et al. |
| 5,959,059 A | 9/1999 | Vedula et al. |
| 5,976,035 A | 11/1999 | Umezawa et al. |
| 5,984,807 A | 11/1999 | Wai et al. |
| 6,083,119 A | 7/2000 | Sullivan et al. |
| 6,123,628 A | 9/2000 | Ichikawa et al. |
| 6,290,614 B1 * | 9/2001 | Kennedy et al. ............ 473/378 |

OTHER PUBLICATIONS

Bayer Corporation, "Engineering Polymers Properties Guide Thermoplastics and Polyurethanes," brochure, pp. 2–7, 28–29.

Polyurethane Handbook, "Chemistry–Raw Materials–Processing Applications–Properties," edited by Oertel et al., Hanser/Gardner Publications, Inc., 101, 102 (1994).

Translated Claims for JP 1,771,941 publ. Aug. 6, 1992.

Translated Claims for JP 1,795,357 publ. Jan. 19, 1993.

A Design Guide, "RIM Part and Mold Design," Bayer Corporation, 1–84 (1995).

DuPont NUCREL 035 Resin, DuPont Company, Wilmington, DE 1989 (no date).

Escor Acid Terpolymers, Exxon Chemical Co.

A General Reference Manual, "The Chemistry of Polyurethane Coatings," Mobay Corporation, 1–16 (1988).

A Properties Guide, "Thermoplastics and Polyurethanes," Bayer Corporation, 1–29 (no date).

Product Announcement, "New Polyurea System Offering Rapid Mold Times And Excellent Thermal Stability For Automotive Fasciasd Is Introduced By Mobay", PRNewswire, Mar. 1, 1998.

* cited by examiner

GOLF BALL WHICH INCLUDES FAST-CHEMICAL-REACTION-PRODUCED COMPONENT AND METHOD OF MAKING SAME

CROSS REFERENCES TO RELATED APPLICATIONS

This application is a continuation application of U.S. patent application Ser. No. 09/411,690 filed Oct. 1, 1999 now U.S. Pat. 6,290,614 which is a continuation-in-part application of U.S. patent application Ser. No. 09/040,798 filed Mar. 18, 1998.

FIELD OF THE INVENTION

The present invention generally relates to golf balls, and more particularly to golf balls which contain a fast-chemical-reaction-produced component, such as that utilized in a core, and intermediate and/or cover layers. Each of the core and/or layers may include one or more different layers.

BACKGROUND OF THE INVENTION

Golf balls utilize, in general, three types of configurations. The first type is a multi-piece wound ball in which a vulcanized rubber thread is wound under tension around a solid or semi-solid core, and thereafter enclosed in a single or multi-layer covering of a tough, protective material.

A second type of a golf ball is a one-piece ball formed from a solid mass of resilient material which has been cured to develop the necessary degree of hardness to provide utility. One-piece molded balls do not have a second enclosing cover.

A third type of ball is a multi-piece, non-wound ball that includes a liquid, gel or solid core of one or more layers and a cover having one or more layers formed over the core.

Conventional golf ball covers have been made of ionomer, balata, and slow-reacting, thermoset polyurethane. When polyurethane covers are made by conventional methods, such as by casting, a substantial amount of time and energy are required, thus resulting in relatively high cost.

It would be useful to develop a golf ball containing a fast-chemical-reaction-produced component, such as at least one core or cover layer, particularly one which contains polyurethane, polyurea, epoxy and/or unsaturated polyester.

SUMMARY OF THE INVENTION

The present invention relates to new and improved golf balls which overcome the above-referenced problems of others. In this regard, the present invention is directed to a golf ball having a polyurethane cover which is formed by a fast chemical reaction.

Another object of the invention is to provide a non-ionomeric golf ball cover which is efficiently produced by injection molding.

Yet another object of the invention is to provide a golf ball which contains polyurethane.

A further object of the invention is to provide a golf ball in which material from recycling polyurethane can be used to result in an efficient manufacturing process.

A further object of the invention is to produce a durable golf ball containing polyurethane, polyurea, epoxy, and/or unsaturated polyesters.

Another object of the invention is to provide a golf ball with a "seamless" cover layer, i.e., a cover layer having generally the same microscopic and molecular structure distribution both in the regions adjacent to the parting line of the mold and at locations which are not adjacent to the parting line, including near the poles.

Yet another object of the invention is to provide a method of making a golf ball of the type described above.

Still another object of the invention is to provide a method of making a multi-piece golf ball, making at least one of a cover component and a core component of the ball by mixing two or more materials that react to form a reaction product with a flex modulus of 1 to 310 kpsi, a setting time of about 30 seconds or less, the component having a thickness of at least 0.01 inches, and a demold or mold release time of 2 minutes or less, including the reaction time. The composition preferably comprises at least one member selected from the group consisting of polyurethanes, polyureas, epoxies and unsaturated polyesters. The reaction product preferably is formed by reaction injection molding. The component preferably has a thickness of at least 0.02 inches.

Another object of the invention is to provide a multi-piece golf ball comprising a reaction injection molded material comprising polyurethane/polyurea. The golf ball cover preferably has a Shore D hardness in the range of 10 to 95, more preferably 30 to 75, and a flex modulus in the range of 1 to 310 kpsi, and more preferably 5 to 100 kpsi and even more preferably 10 to 80 kpsi. Preferably, at least 5% of the polyurethane/polyurea is formed from molecules obtained by recycling a material comprising at least one of polyurethane, polyurea, polyester and polyethylene glycol.

Yet another object of the invention is to provide a process for producing a golf ball including the step of reaction injection molding a polyurethane/polyurea material to form at least one of a core layer and a cover layer of the ball.

A further object of the invention is to provide a process for producing a golf ball comprising the steps of (a) reaction injection molding a polyurethane/polyurea component of the ball, and (b) recycling some of the polyurethane and/or polyurea that is produced in connection with step (a) but that is not incorporated in the golf ball in step (a). The polyurethane/polyurea preferably, but not necessarily, is recycled by glycolysis.

Yet another object of the invention is to provide a process for producing a golf ball comprising (a) forming a core, (b) covering the core, and (c) coating and adding indicia to the covered ball, wherein at least one of steps (a) and (b) comprises reaction injection molding of a polyurethane and/or polyurea material. The golf ball of the invention can include, in the cover, optical brighteners, white pigment, UV stabilizers, antioxidants, etc. The cover and/or core may further include fillers such as $TiO_2$, glass, metal, and other fillers described below.

Yet another object of the invention is to provide a golf ball having a cover comprising a blend of polyurethane and ionomer, wherein the ionomer is a partially cation neutralized organic acid polymer, preferably an alpha, beta unsaturated carboxylic acid with 3 or more carbon atoms. The ionomer may be a polyurethane ionomer.

A further object of the invention is to provide a golf ball comprising at least one fast-chemical-reaction-produced layer, the layer having a flex modulus of 1 to 310 kpsi, with a setting time of about 30 seconds or less and a thickness of at least 0.01 inch.

Yet another object of the invention is to provide a golf ball having a core and a cover, the cover comprising polyurethane/polyurea which is formed from reactants, and 5 to 100 weight percent of which are obtained from recycled polyurethane.

Other objects of the invention will become apparent from the specification, drawings and claims.

BRIEF DESCRIPTION OF THE DRAWINGS

The following is a brief description of the drawings which are presented for the purposes of illustrating the invention and not for purposes of limiting the invention.

DETAILED DESCRIPTION OF THE PREFERRED EMBODIMENTS

Figure 1:
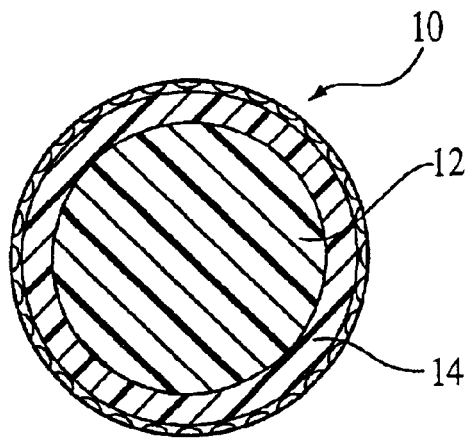
FIG. 1 is a first embodiment of a golf ball formed according to a reaction injection molded (RIM) process according to the invention

The preferred embodiment of the present invention is a golf ball in which at least one cover or core layer comprises a fast-chemical-reaction-produced component. This component includes at least one material selected from the group consisting of polyurethane, polyurea, polyurethane ionomer, epoxy, and unsaturated polyesters, and preferably comprises polyurethane. The invention also includes a method of producing a golf ball which contains a fast-chemical-reaction-produced component. A golf ball formed according to the invention preferably has a flex modulus in the range of from about 1 to about 310 kpsi, a Shore D hardness in the range of from about 10 to about 95, and good durability. Particularly preferred forms of the invention also provide for a golf ball with a fast-chemical-reaction-produced cover having good scuff resistance and cut resistance. As used herein, "polyurethane and/or polyurea" is expressed as "polyurethanelpolyurea".

A particularly preferred form of the invention is a golf ball with a cover comprising polyurethane, wherein the cover includes from about 5 to about 100 weight percent of polyurethane formed from recycled polyurethane.

The method of the invention is particularly useful in forming golf balls because it can be practiced at relatively low temperatures and pressures. The preferred temperature range for the preferred method of the invention is from about 90 to about 180° F. when the component being produced contains polyurethane. Preferred pressures for practicing the invention using polyurethane-containing materials are 200 psi or less and more preferably 100 psi or less. The method of the present invention offers numerous advantages over conventional slow-reactive process compression molding of golf ball covers. The method of the present invention results in molded covers in a mold release or demold time of 10 minutes or less, preferably 2 minutes or less, and most preferably in 1 minute or less. The method of the present invention results in the formation of a reaction product, formed by mixing two or more reactants together, that exhibits a reaction time of about 2 minutes or less, preferably 1 minute or less, and most preferably about 30 seconds or less. An excellent finish can be produced on the ball.

The term "demold time" generally refers to the mold release time, which is the time span from the mixing of the components until the earliest possible removal of the finished part, sometimes referred to in the industry as "green strength." The term "reaction time" generally refers to the setting time or curing time, which is the time span from the beginning of mixing until a point is reached where the polyaddition product no longer flows. Further description of the terms "setting time" and "mold release time" are provided in the "Polyurethane Handbook," Edited by Günter Oertel, Second Edition, ISBN 1-56990-157-0, herein incorporated by reference.

The method of the invention also is particularly effective when recycled polyurethane or other polymer resin, or materials derived by recycling polyurethane or other polymer resin, is incorporated into the product. The process may include the step of recycling at least a portion of the reaction product, preferably by glycolysis. 5–100% of the polyurethane/polyurea formed from the reactants used to form particular components is obtained from recycled polyurethane/polyurea.

As indicated above, the fast-chemical-reaction-produced component can be one or more cover and/or core layers of the ball. When a polyurethane cover is formed according to the invention, and is then covered with a polyurethane top coat, excellent adhesion can be obtained. The adhesion in this case is better than adhesion of a polyurethane coating to an ionomeric cover. This improved adhesion can result in the use of a thinner top coat, the elimination of a primer coat, and the use of a greater variety of golf ball printing inks beneath the top coat. These include but are not limited to typical inks such as one component polyurethane inks and two component polyurethane inks.

The preferred method of forming a fast-chemical-reaction-produced component for a golf ball according to the invention is by reaction injection molding (RIM). RIM is a process by which highly reactive liquids are injected into a closed mold, mixed usually by impingement and/or mechanical mixing in an in-line device such as a "peanut mixer", where they polymerize primarily in the mold to form a coherent, one-piece molded article. The RIM processes usually involve a rapid reaction between one or more reactive components such as polyether—or polyester-polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, e.g., 1500 to 3000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures which occur in a conventional injection molding. In contrast, injection molding is conducted at high molding pressures in the mold cavity by melting a solid resin and conveying it into a mold, with the molten resin often being at about 150 to about 350° C. At this elevated temperature, the viscosity of the molten resin usually is in the range of 50,000 to about 1,000,000 centipoise, and is typically around 200,000 centipoise. In an injection molding process, the solidification of the resins occurs after about 10 to about 90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold. In contrast, in a RIM process, the chemical reaction causes the material to set, typically in less than about 5 minutes, often in less than 2 minutes, preferably less than 1 minute, more preferably in less than 30 seconds, and in many cases in about 10 seconds or less.

If plastic products are produced by combining components that are preformed to some extent, subsequent failure can occur at a location on the cover which is along the seam or parting line of the mold. Failure can occur at this location because this interfacial region is intrinsically different from the remainder of the cover layer and can be weaker or more stressed. The present invention is believed to provide for improved durability of a golf ball cover layer by providing a uniform or "seamless" cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials eliminates knit-lines and other molding deficiencies which can be caused by temperature difference and/or reaction difference in the injected materials. The process of the invention results in generally uniform molecular structure, density and stress distribution as compared to conventional injection-molding processes.

The fast-chemical-reaction-produced component has a flex modulus of 1 to 310 kpsi, more preferably 5 to 100 kpsi, and most preferably 5 to 80 kpsi. The subject component can be a cover with a flex modulus which is higher than that of the centermost component of the cores, as in a liquid center core and some solid center cores. Furthermore, the fast-chemical-reaction-produced component can be a cover with a flex modulus that is higher than that of the immediately underlying layer, as in the case of a wound core. The core can be one piece or multi-layer, each layer can be either foamed or unfoamed, and density adjusting fillers, including metals, can be used. The cover of the ball can be harder or softer than any particular core layer.

The fast-chemical-reaction-produced component can incorporate suitable additives and/or fillers. When the component is an outer cover layer, pigments or dyes, accelerators and UV stabilizers can be added. Examples of suitable optical brighteners which probably can be used include Uvitex and Eastobrite OB-1. An example of a suitable white pigment is titanium dioxide. Examples of suitable and UV light stabilizers are provided in commonly assigned U.S. Pat. No. 5,494,291, herein incorporated by reference. Fillers which can be incorporated into the fast-chemical-reaction-produced cover or core component include those listed herein. Furthermore, compatible polymeric materials can be added. For example, when the component comprises polyurethane and/or polyurea, such polymeric materials include polyurethane ionomers, polyamides, etc.

A golf ball core layer formed from a fast-chemical-reaction-produced material according to the present invention typically contains 0 to 20 weight percent of such filler material, and more preferably 1 to 15 weight percent. When the fast-chemical-reaction-produced component is a core, the additives typically are selected to control the density, hardness and/or COR.

A golf ball inner cover layer or mantle layer formed from a fast-chemical-reaction-produced material according to the present invention typically contains 0 to 60 weight percent of filler material, more preferably 1 to 30 weight percent, and most preferably 1 to 20 weight percent.

A golf ball outer cover layer formed from a fast-chemical-reaction-produced material according to the present invention typically contains 0 to 20 weight percent of filler material, more preferably 1 to 10 weight percent, and most preferably 1 to 5 weight percent.

Catalysts can be added to the RIM polyurethane system starting materials as long as the catalysts generally do not react with the constituent with which they are combined. Suitable catalysts include those which are known to be useful with polyurethanes and polyureas.

The reaction mixture viscosity should be sufficiently low to ensure that the empty space in the mold is completely filled. The reactant materials generally are preheated to 90 to 150° F. before they are mixed. In most cases it is necessary to preheat the mold to, e.g., 100 to 180° F., to ensure proper injection viscosity.

As indicated above, one or more cover layers of a golf ball can be formed from a fast-chemical-reaction-produced material according to the present invention.

Referring now to the drawings, and first to FIG. 1, a golf ball having a cover comprising a RIM polyurethane is shown. The golf ball 10 includes a polybutadiene core 12 and a polyurethane cover 14 formed by RIM.

Figure 2:
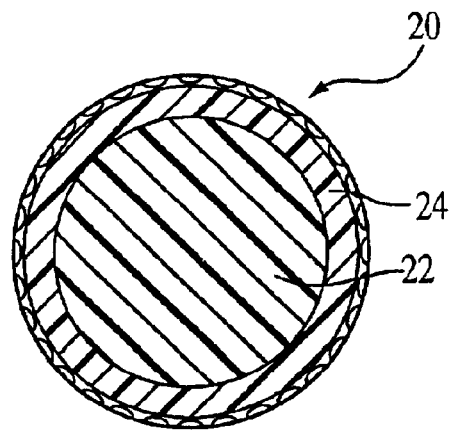
FIG. 2 is a second embodiment of a golf ball formed according to a reaction injection molded (RIM) process according to the invention.

Referring now to FIG. 2, a golf ball having a core comprising a RIM polyurethane is shown. The golf ball 20 has a RIM polyurethane core 22, and a RIM polyurethane cover 24.

Figure 3:
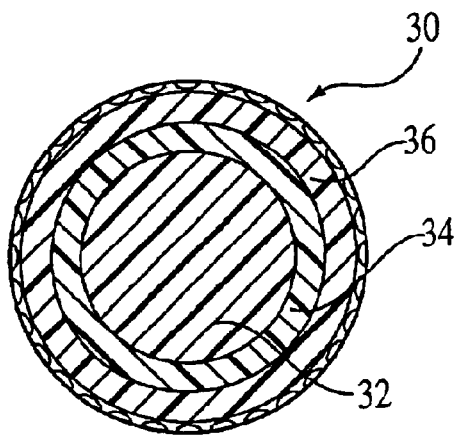
FIG. 3 is a third embodiment of a golf ball formed according to a reaction injection molded (RIM) process according to the invention.

Referring to FIG. 3, a multi-layer golf ball 30 is shown with a solid core 32 containing recycled RIM polyurethane, a mantle cover layer 34 comprising RIM polyurethane, and an outer cover layer 36 comprising ionomer or another conventional golf ball cover material. Such conventional golf ball cover materials typically contain titanium dioxide utilized to make the cover white in appearance. Non-limiting examples of multi-layer golf balls according to the invention with two cover layers include those with RIM polyurethane mantles having a thickness of from about 0.01 to about 0.20 inches and a Shore D hardness of 10 to 95, covered with ionomeric or non-ionomeric thermoplastic, balata or other covers having a Shore D hardness of from about 10 to about 95 and a thickness of 0.020 to 0.20 inches.

Figure 4:
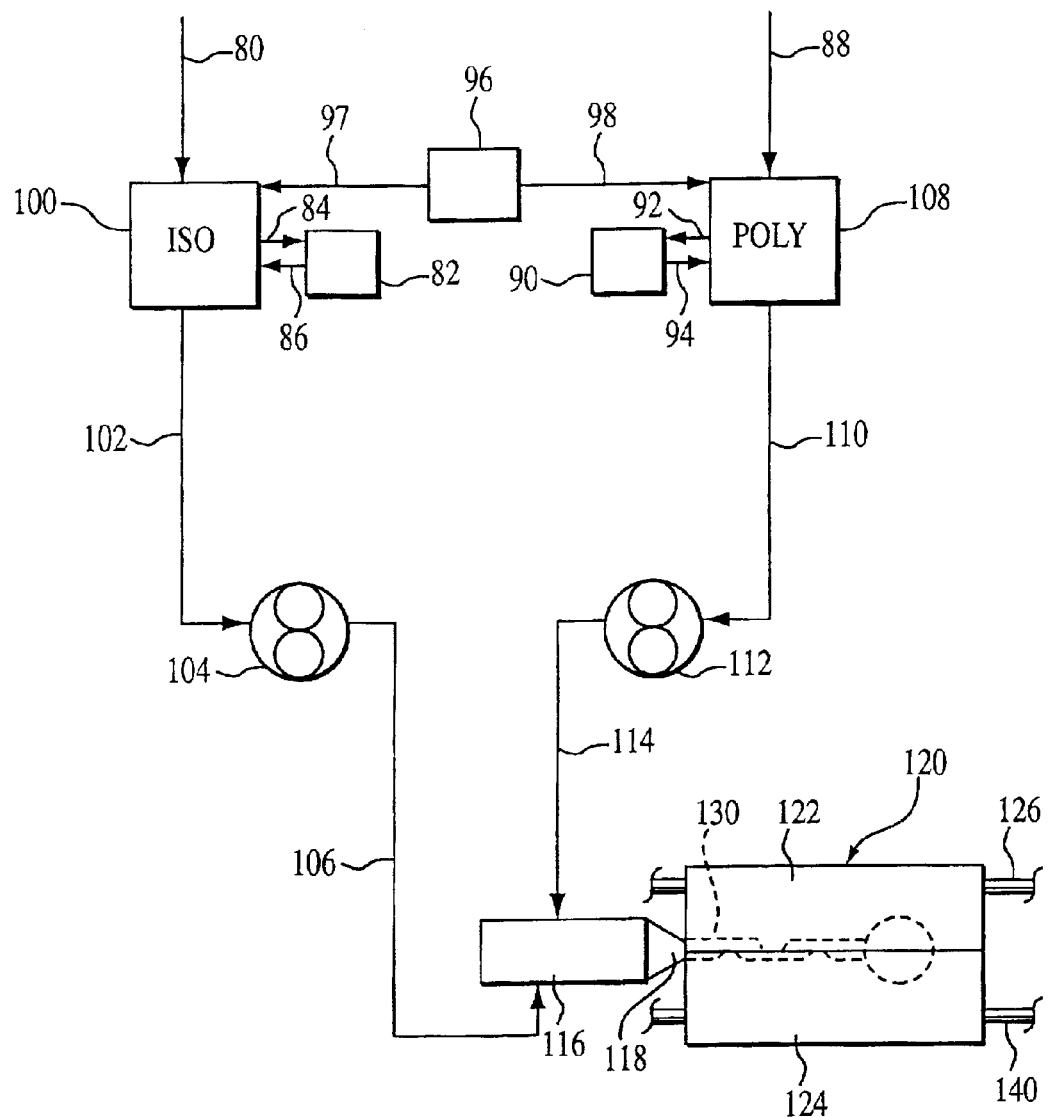
FIG. 4 is a process flow diagram which schematically depicts a reaction injection molding process according to the invention.

Referring next to FIG. 4, a process flow diagram for forming a RIM cover of polyurethane is shown. Isocyanate from bulk storage is fed through line 80 to an isocyanate tank 100. The isocyanate is heated to the desired temperature, e.g. 90 to about 150° F., by circulating it through heat exchanger 82 via lines 84 and 86. Polyol, polyamine, or another compound with an active hydrogen atom is conveyed from bulk storage to a polyol tank 108 via line 88. The polyol is heated to the desired temperature, e.g. 90 to about 150° F., by circulating it through heat exchanger 90 via lines 92 and 94. Dry nitrogen gas is fed from nitrogen tank 96 to isocyanate tank 100 via line 97 and to polyol tank 108 via line 98. Isocyanate is fed from isocyanate tank 100 via line 102 through a metering cylinder or metering pump 104 into recirculation mix head inlet line 106. Polyol is fed from polyol tank 108 via line 110 through a metering cylinder or metering pump 112 into a recirculation mix head inlet line 114. The recirculation mix head 116 receives isocyanate and polyol, mixes them, and provides for them to be fed through nozzle 118 into injection mold 120. The injection mold 120 has a top mold 122 and a bottom mold 124. Mold heating or cooling can be performed through lines 126 in the top mold 122 and lines 140 in the bottom mold 124. The materials are kept under controlled temperature conditions to insure that the desired reaction profile is maintained.

The polyol component typically contains additives, such as stabilizers, flow modifiers, catalysts, combustion modifiers, blowing agents, fillers, pigments, optical brighteners, and release agents to modify physical characteristics of the cover. Recycled polyurethane/polyurea also can be added to the core. Polyurethane/polyurea constituent molecules that were derived from recycled polyurethane can be added in the polyol component.

Inside the mix head 116, injector nozzles impinge the isocyanate and polyol at ultra-high velocity to provide excellent mixing. Additional mixing preferably is conducted using an aftermixer 130, which typically is constructed inside the mold between the mix head and the mold cavity.

Figure 5:
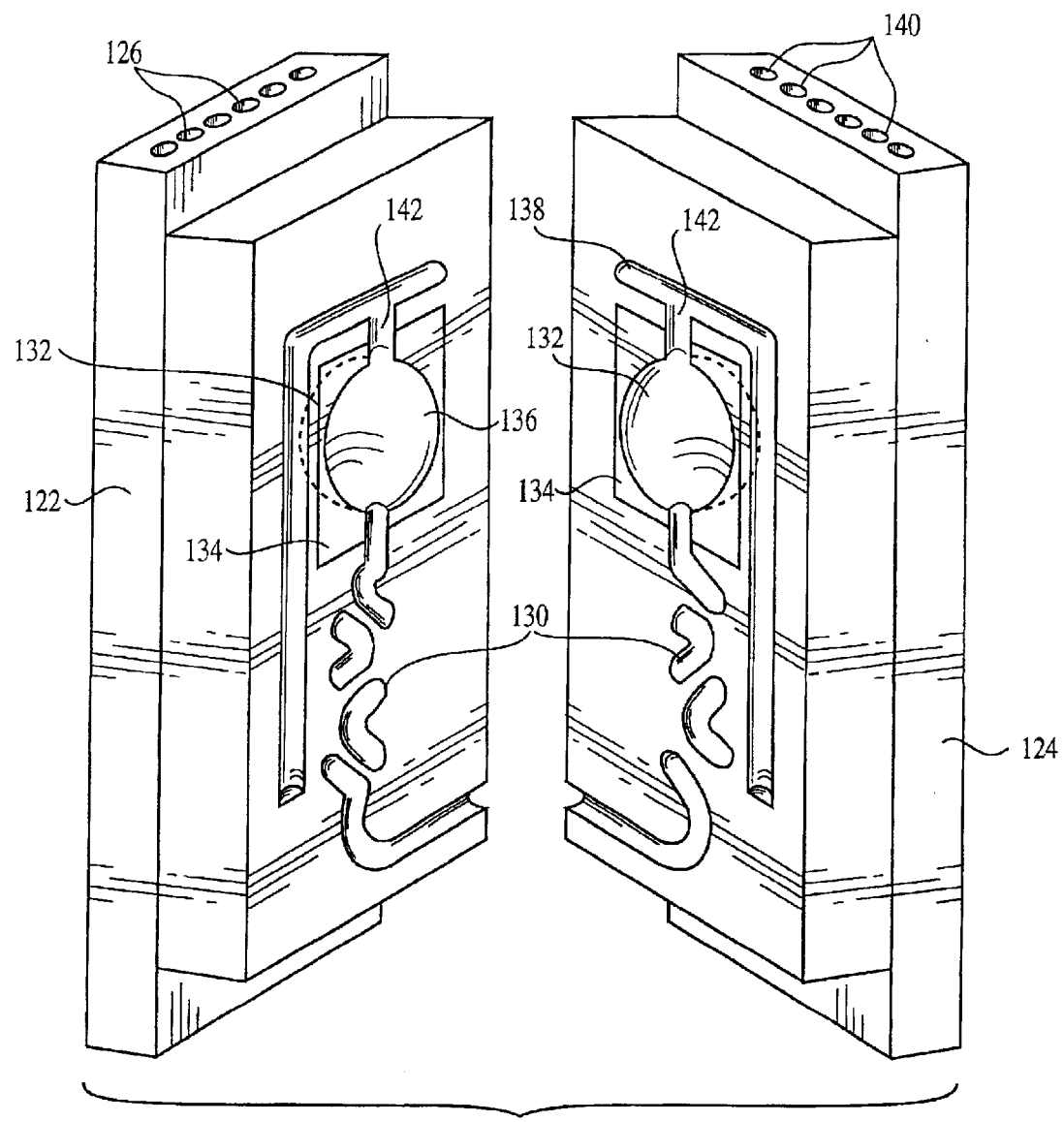
FIG. 5 schematically shows a mold for reaction injection molding a golf ball cover according to the invention.

As is shown in FIG. 5, the mold includes a golf ball cavity chamber 132 in which a spherical golf ball cavity 134 with a dimpled, inner spherical surface 136 is defined. The aftermixer 130 can be a peanut aftermixer, as is shown in FIG. 5, or in some cases another suitable type, such as a heart, harp or dipper. However, the aftermixer does not have to be incorporated into the mold design. An overflow channel 138 receives overflow material from the golf ball cavity 134 through a shallow vent 142. Heating/cooling passages 126 and 140, which preferably are in a parallel flow arrangement, carry heat transfer fluids such as water, oil, etc. through the top mold 122 and the bottom mold 124.

The mold cavity contains retractable pins and is generally constructed in the same manner as a mold cavity used to injection mold a thermoplastic, e.g., ionomeric golf ball cover. However, two differences when RIM is used are that tighter pin tolerances generally are required, and a lower injection pressure is used. Also, the molds can be produced from lower strength material such as aluminum.

The golf balls formed according to the present invention can be coated using a conventional two-component spray coating or can be coated during the RIM process, i.e., using an in-mold coating process.

One of the significant advantages of the RIM process according to the invention is that polyurethane or other cover materials can be recycled and used in golf ball cores. Recycling can be conducted by, e.g., glycolysis. Typically, 10 to 90% of the material which is injection molded actually becomes part of the cover. The remaining 10 to 90% is recycled.

Recycling of polyurethanes by glycolysis is known from, for example, RIM Part and Mold Design—Polyurethanes, 1995, Bayer Corp., Pittsburgh, Pa. Another significant advantage of the present invention is that because reaction injection molding occurs at low temperatures and pressures, i.e., 90 to 180° F. and 50 to 200 psi, this process is particularly beneficial when a cover is to be molded over a very soft core. When higher pressures are used for molding over soft cores, the cores "shut off" i.e., deform and impede the flow of material causing uneven distribution of cover material.

One polyurethane component which can be used in the present invention incorporates TMXDI (META) aliphatic isocyanate (Cytec Industries, West Paterson, N.J.). Polyurethanes based on meta-tetramethylxylyliene diisocyanate can provide improved gloss retention, UV light stability, thermal stability and hydrolytic stability. Additionally, TMXDI (META) aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

Golf ball cores also can be made using the materials and processes of the invention. To make a golf ball core using RIM polyurethane, the same processing conditions are used as are described above with respect to covers. One difference is, of course, that no retractor pins are needed in the mold. Furthermore, an undimpled, smaller mold is used. If, however, a one piece ball is desired, a dimpled mold would be used. Polyurethanes also can be used for cores.

Golf balls typically have indicia and/or logos stamped or formed thereon. Such indicia can be applied by printing using a material or a source of energetic particles after the ball core and/or cover have been reaction-injection-molded according to the present invention. Printed indicia can be formed from a material such as ink, foil (for use in foil transfer), etc. Indicia printed using a source of energetic particles or radiation can be applied by burning with a laser, burning with heat, directed electrons, or light, phototransformations of, e.g., UV ink, impingement by particles, impingement by electromagnetic radiation, etc. Furthermore, the indicia can be applied in the same manner as an in-mold coating, i.e., by applying to the indicia to the surface of the mold prior to molding of the cover.

The polyurethane which is selected for use as a golf ball cover preferably has a Shore D hardness of 10 to 95, more preferably 30 to 75, and most preferably 30 to 50 for a soft cover layer and 50 to 75 for a hard cover layer. The polyurethane which is to be used for a cover layer preferably has a flex modulus of 1 to 310 kpsi, more preferably 5 to 100 kpsi, and most preferably 5 to 20 kpsi for a soft cover layer and 30 to 70 kpsi for a hard cover layer.

Non-limiting examples of suitable RIM systems for use in the present invention are Bayflex® elastomeric polyurethane RIM systems, Baydur® GS solid polyurethane RIM systems, Prism® solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and Elastolit SR systems from BASF (Parsippany, N.J.). Preferred RIM systems include Bayflex® MP-10000 and Bayflex® 110-50, filled and unfilled. Further preferred examples are polyols, polyamines and isocyanates formed by processes for recycling polyurethanes and polyureas.

A wide array of materials may be used for the cores and mantle layer(s) of the present invention golf balls. For instance, the core and mantle or interior layer materials disclosed in U.S. Pat. Nos. 5,833,553; 5,830,087; 5,820,489; and 5,820,488, all of which are hereby incorporated by reference, may be employed. In particular, it is preferred to utilize the cores described in U.S. application Ser. No. 09/226,340 filed Jan. 6, 1999; and Ser. No. 09/226,727 filed Jan. 7, 1999, both of which are hereby incorporated by reference.

The following examples are included for purposes of illustration and are not intended to be limiting.

EXAMPLE 1

A polybutadiene golf ball core having a diameter of 1.545 inches, a PGA compression of about 65 and a coefficient of restitution of about 0.770 was obtained. A dimpled cover having a thickness of 0.0675 inches was reaction injection molded over the core. The cover comprised Bayflex MP 10000 resin (Bayer). The resulting ball had a PGA compression of 78, a COR of 0.720 and a Shore D cover hardness of 39. The ball met standard durability tests and had an excellent scuff resistance rating of 1. It is expected that this cover also has an excellent cut resistance rating. Descriptions of these tests are provided after Table 4 herein.

EXAMPLE 2

A polybutadiene golf ball center having a diameter of 1.48 inches, a PGA compression of about 45, and a coefficient of restitution (COR) of about 0.788 was obtained. A 0.050 inch thick mantle layer was then injection molded over the center, made from a high acid thermoplastic ionomer material. The mantled core diameter was 1.58 inches, its PGA compression was about 75, and its COR was about 0.810. A dimpled cover having a thickness of about 0.050 inches was reaction injection molded over the mantled core. The cover was comprised of Bayer's Bayflex MP 10000 resin. The setting time of the mixed resin was about 4.5 seconds and the mold release time was about 20 seconds. The isocyanate tank temperature was about 115° F. and the polyol tank temperature was about 138° F. The mold temperature was about 157° F. The resulting ball, after painting, had a pole diameter of about 1.6877 inches, an equator diameter of about 1.6880 inches, a weight of about 45.61 grams, a PGA compression of about 80, a COR of about 0.793, a moment of inertia of about 0.448 oz-in$^2$, a drop rebound (based on a 100 inches drop) of about 76 inches, and a Shore D (peak) hardness of about 40 (measured on a 0.130 inch thick plaque of MP 10000). The painted ball scuff resistance rating was a 3, showing minimal groove line cuts and lifting. The cut resistance ranking was a 1, showing little or virtually no signs of denting or cutting. These scuff and cut results as well as those for Example 3 as follows were obtained using the same scuff and cut procedures described as follows in Tables 1 and 2 set forth below. The scuff and cut results for Example 1 were obtained using different procedures later described herein.

TABLE 1

Scuff Resistance Procedure

Used the Miyamae mechanical driving machine, with the club described below mounted in the machine
Club: Maltby Logic Pro Tour sand wedge, with box (square) grooves cut to .025 inch wide (No post sandblasting - "worst case" groove type).

TABLE 1-continued

Scuff Resistance Procedure

Clubhead speed: 58 mph
Each ball was hit three times, alternating ball types after every hit. The clubface was brushed clean after each hit to ensure consistent groove contact.
The balls were subjectively ranked from 1 to 6, 1 being the best (showing little or no visible damage), 6 being the worst (showing gross amounts of groove cutting, lifting, and peeling damage).

TABLE 2

Cut Resistance Procedure

Used an in-house, Spalding-made guillotine device. The device consisted of a 5 lb. (approx.) strike plate positioned approx. 40.5 inches (full height) above the golf ball. The strike surface was approx. 1.5 inch wide, by 0.125 inch thick, possessing tapered sides and a notched section in the middle of the strike surface. The weighted strike plate was allowed to drop by the force of gravity alone onto the golf ball.
Each ball was struck three times.
The balls were subjectively ranked from 1 to 6, 1 being the best (showing little or no visible damage), 6 being the worst (showing a clean cut through the cover material).

EXAMPLE 3

A polybutadiene golf ball center having a diameter of 1.51 inches, a PGA compression of about 42, and a coefficient of restitution (COR) of about 0.786 was obtained. A 0.050 inch thick mantle layer was then injection molded over the center, made from a high acid thermoplastic ionomer material. The mantled core diameter was 1.61 inches, its PGA compression was about 73, and its COR was about 0.810. A dimpled cover having a thickness of about 0.035 inches was reaction injection molded over the mantled core. The cover was comprised of Bayer's Bayflex MP 10000 resin. The setting time of the mixed resin was about 4.5 seconds and the mold release time was about 20 seconds. The isocyanate tank temperature was about 115° F. and the polyol tank temperature was about 138° F. The mold temperature was about 156° F. The resulting ball, after painting, had a pole diameter of about 1.6896 inches, an equator diameter of about 1.6900 inches, a weight of about 45.68 grams, a PGA compression of about 79, a COR of about 0.799, a moment of inertia of about 0.451 oz-in$^2$, a drop rebound (based on a 100 inches drop) of about 78 inches, and a Shore D (peak) hardness of about 40 (measured on a 0.130 inch thick plaque of MP 10000). The painted ball scuff resistance rating was a 3, showing minimal groove line cuts and lifting. The cut resistance ranking was a 1, showing little or virtually no signs of denting or cutting. Again, the scuff and cut results obtained in Example 1 were obtained using different procedures later described in the Definitions portion of the patent.

EXAMPLE 4

Prophetic

A golf ball core formed from high cis polybutadiene, zinc diacrylate, zinc oxide, zinc stearate, and peroxide initiator is obtained. The core has a diameter of 1.49 inches.

The core is covered with a 0.04 inch thick mantle layer of RIM polyurethane which has a plaque Shore D hardness of 58, namely Bayflex® 110-50 unfilled (Bayer Corp.). The mantle layer is covered with a 0.055 inch thick dimpled outer cover layer of Iotek 8000, 7510 and 7030, and a whitener package. The formulation and properties of the golf ball are shown below in Table 3.

EXAMPLE 5

Prophetic

A golf ball core formed from high-cis polybutadiene, zinc diacrylate, zinc oxide, zinc stearate and peroxide imitator is obtained. The core has a diameter of 1.49 inches.

The core is covered with a 0.040 inch thick mantle layer of RIM polyurethane having a plaque Shore A hardness of about 90, namely Bayflex® MP 10000 unfilled (Bayer Corp.). The mantle layer is covered with a 0.055 inch thick dimpled outer cover layer of Ex 1006 and 1007 (Exxon Corp.) and Iotek 7030 (Exxon Corp.). The formulations and properties of the golf ball are shown below in Table 3.

EXAMPLE 6

Prophetic

A golf ball core formed from high-cis polybutadiene, zinc diacrylate, zinc oxide, zinc stearate, and peroxide initiator is obtained. The core has a diameter of 1.49 inches.

The core is covered with a 0.055 inch thick mantle layer of Iotek 1002 and 1003 (Exxon Corp.). The mantle layer is covered with a 0.04 inch thick dimpled outer cover layer of RIM Bayflex® MP10000 unfilled (Bayer Corp.). The formulation and properties of the golf ball are shown below in Table 3.

EXAMPLE 7

Prophetic

A golf ball core having a diameter of 1.42 inches is formed from an elastomeric unfilled RIM polyurethane (Bayflex® MP10000, Bayer Corp.). The core is covered with a 0.08 inch thick injection-molded mantle layer of 50 parts by weight Iotek 1002 and 50 parts by weight Iotek 1003. The mantle layer is covered with a 0.050 inch thick injection-molded outer cover layer of Ex 1006, Ex 1007, Iotek 7030, and whitener. The formulation and properties of the golf ball are shown below in Table 3.

EXAMPLE 8

Prophetic

A two-piece golf ball having a core with a diameter of 1.560 inches and a cover of 0.060 inches may be formed. The core comprises polybutadiene, zinc diacrylate (ZDA), and zinc oxide. The cover comprises an elastomeric unfilled RIM polyurethane (Bayflex® MP10000, from Bayer Corp.).

TABLE 3

| Chemical Component | Example 2 | Example 3 | Example 4 | Example 5 | Example 6 | Example 7 |
|---|---|---|---|---|---|---|
| Core Data | | | | | | |
| Size | 1.48" | 1.51" | 1.49" | 1.49" | 1.49" | 1.42" |
| Type | | | | | | |
| Polybutadiene | Y | Y | Y | Y | Y | — |
| RIM Polyurethane | — | — | — | — | — | Y |
| Inner Cover Layer | | | | | | |
| Size | 1.58" | 1.61" | 1.57" | 1.57" | 1.57" | 1.58" |
| Weight | 38 g | 40 g | 38 g | — | 38 g | — |
| Thickness | 0.50" | .050" | 0.040" | 0.040" | 0.055" | 0.080" |
| Hardness (Shore A or D) | 68D | 68D | 58D | 90A plaque | 70D | 70D |
| Composition (wt %) | | | | | | |
| Iotek 1002 | | | — | — | 50 | 50 |
| Iotek 1003 | | | — | — | 50 | 50 |
| Bayflex 110-50 unfilled | | | 100 | — | — | — |
| Bayflex MP 10000 | | | — | 100 | — | — |
| 8140-Surlyn | 50 | 50 | | | | |
| 6120-Surlyn | 50 | 50 | | | | |
| Outer Cover Layer | | | | | | |
| Hardness (Shore A or D) | 40D plaque | 40D plaque | 57D | 64D | 90A plaque | 64D |
| Thickness | .050" | 035" | 0.055" | 0.055" | 0.040" | 0.050" |
| Composition (wt %) | | | | | | |
| Bayflex MP 10000 | 100 | 100 | — | — | 100 | — |
| Exxon 1006 | | | — | 46.4 | — | 46.4 |
| Exxon 1007 | | | — | 46.4 | — | 46.4 |
| Iotek 8000 | | | 33.8% | — | — | — |
| Iotek 7510 | | | 58.9% | — | — | — |
| Iotek 7030 | | | 73 | 72 | — | 72 |

TABLE 3-continued

|  | Example 2 | Example 3 | Example 4 | Example 5 | Example 6 | Example 7 |
|---|---|---|---|---|---|---|
| Whitener Package |  |  |  |  |  |  |
| Unitane 0-110 (phr) |  |  | 23 | 23 | 23 | 23 |
| Eastobrite OB1 (phr) |  |  | 0.025 | 0.025 | 0.025 | 0.025 |
| Ultra Marine Blue (phr) |  |  | 0.004 | 0.004 | 0.004 | 0.004 |
| Final Ball Data |  |  |  |  |  |  |
| Size | 1.688 | 1.690 | 1.68" | 1.68" | 1.68" | 1 68" |
| Weight | 45.6 g | 45.7 g | 45.5 g | 45.5 g | 45.5 g | 45.5 g |
| COR (× 1000) | 793 | 799 | 760–830 | 760–830 | 760–830 | 760–830 |
| 6120-Surlyn | 50 | 50 |  |  |  |  |

Note:
The flex modulus of Bayer's MP 10000 in accordance with ASTM test D790, at 23° C., is 10,000 psi (10 ksi.).

In a particularly preferred form of the invention, at least one layer of the golf ball contains at least one part by weight of a filler. Fillers preferably are used to adjust the density, flex modulus, mold release, and/or melt flow index of a layer. More preferably, at least when the filler is for adjustment of density or flex modulus of a layer, it is present in an amount of at least 5 parts by weight based upon 100 parts by weight of the layer composition. With some fillers, up to about 200 parts by weight probably can be used.

A density adjusting filler according to the invention preferably is a filler which has a specific gravity which is at least 0.05 and more preferably at least 0.1 higher or lower than the specific gravity of the layer composition. Particularly preferred density adjusting fillers have specific gravities which are higher than the specific gravity of the resin composition by 0.2 or more, and even more preferably by 2.0 or more.

A flex modulus adjusting filler according to the invention is a filler which, e.g. when used in an amount of 1 to 100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 weight percent based upon the total weight of the layer.

A melt flow index adjusting filler is a filler which increases or decreases the melt flow, or ease of processing of the composition.

The layers may contain coupling agents that increase adhesion of materials within a particular layer, e.g. to couple a filler to a resin composition, or between adjacent layers. Non-limiting examples of coupling agents include titanates, zirconates and silanes. Coupling agents typically are used in amounts of 0.1 to 2 weight percent based upon the total weight of the composition in which the coupling agent is included.

A density adjusting filler is used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer of a filler with a higher specific gravity than the resin composition, results in an increase in moment of inertia and a lower initial spin rate. High specific gravity fillers are preferred as less volume is used to achieve the desired inner cover total weight Nonreinforcing fillers are also preferred as they have minimal effect on COR. Preferably, the filler does not chemically react with the resin composition to a substantial degree, although some reaction may occur when, for example, zinc oxide is used in a shell layer which contains some ionomer.

The density-increasing fillers for use in the invention preferably have a specific gravity in the range of 1.0 to 20. The density-reducing fillers for use in the invention preferably have a specific gravity of 0.06 to 1.4, and more preferably 0.06 to 0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are set forth in Table 4 as follows:

TABLE 4

Filler Table

| Filler Type | Spec. Grav. | Comments |
|---|---|---|
| Precipitated hydrated silica | 2 | 1,2 |
| Clay | 2.62 | 1,2 |
| Talc | 2.85 | 1,2 |
| Asbestos | 2.5 | 1,2 |
| Glass fibers | 2.55 | 1,2 |
| Aramid fibers (KEVLAR ®) | 1.44 | 1,2 |
| Mica | 2.8 | 1,2 |
| Calcium metasilicate | 2.9 | 1,2 |
| Barium sulfate | 4.6 | 1,2 |
| Zinc sulfide | 4.1 | 1,2 |
| Lithopone | 4.2–4.3 | 1,2 |
| Silicates | 2.1 | 1,2 |
| Silicon carbide platelets | 3.18 | 1,2 |
| Silicon carbide whiskers | 3.2 | 1,2 |
| Tungsten carbide | 15.6 | 1 |
| Diatomaceous earth | 2.3 | 1,2 |
| Polyvinyl chloride | 1.41 | 1,2 |
| Carbonates | | |
| Calcium carbonate | 2.71 | 1,2 |
| Magnesium carbonate | 2.2 | 1,2 |
| Metals and Alloys (powders) | | |
| Titanium | 4.51 | 1 |
| Tungsten | 19.35 | 1 |
| Aluminum | 2.7 | 1 |
| Bismuth | 9.78 | 1 |
| Nickel | 8.9 | 1 |
| Molybdenum | 10.2 | 1 |
| Iron | 7.86 | 1 |
| Steel | 7.8–7.9 | 1 |
| Lead | 11.4 | 1,2 |
| Copper | 8.94 | 1 |
| Brass | 8.2–8.4 | 1 |
| Boron | 2.34 | 1 |
| Boron carbide whiskers | 2.52 | 1,2 |
| Bronze | 8.70–8.74 | 1 |
| Cobalt | 8.92 | 1 |
| Berylium | 1.84 | 1 |
| Zinc | 7.14 | 1 |
| Tin | 7.31 | 1 |
| Metal Oxides | | |
| Zinc oxide | 5.57 | 1,2 |
| Iron oxide | 5.1 | 1,2 |
| Aluminum oxide | 4 | |
| Titanium oxide | 3.9–4 | 1,2 |
| Magnesium oxide | 3.3–3.5 | 1,2 |
| Zirdonium oxide | 5.73 | 1,2 |
| Metal Stearates | | |
| Zinc stearate | 1.09 | 3,4 |
| Calcium stearate | 1.03 | 3,4 |
| Barium stearate | 1.23 | 3,4 |
| Lithium stearate | 1.01 | 3,4 |
| Magnesium stearate | 1.03 | 3,4 |
| Particulate carbonaceous materials | | |
| Graphite | 1.5–1.8 | 1,2 |
| Carbon black | 1.8 | 1,2 |
| Natural bitumen | 1.2–1.4 | 1,2 |
| Cotton flock | 1.3–1.5 | 1,2 |
| Leather fiber | 1.2–1.4 | 1,2 |
| Micro balloons | | |
| Glass | 0.15–1.1 | 1,2 |
| Ceramic | 0.2–0.7 | 1,2 |
| Fly ash | 0.6–0.8 | 1,2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the cover layer
2 Particularly useful for adjusting flex modulus of the cover layer
3 Particularly useful for adjusting mold release of the cover layer
4 Particularly useful for increasing melt flow index of the cover layer
All fillers except for metal stearates would be expected to reduce the melt flow index of an injection molded cover layer.
The amount of filler employed is primarily a function of weight requirements and distribution

Scuff Resistance

The scuff resistance test was conducted in the following manner. A Top-Flite tour pitching wedge (1994) with box grooves was obtained and was mounted in a Miyamae driving machine. The club face was oriented for a square hit. The forward/backward tee position was adjusted so that the tee was 4 inches behind the point in the downswing where the club was vertical. The height of the tee and the toe-heel position of the club relative to the tee were adjusted in order that the center of the impact mark was about ¾ of an inch above the sole and was centered to the heel across the face. The machine was operated at a club head speed of 125 feet per second. A minimum of 3 samples of each ball were tested. Each ball was hit 3 times. After testing, the balls were rated according to the following scale:

| Rating | Type of Damage |
|---|---|
| 1 | Little or no damage (groove markings or dents) |
| 2 | Small cuts and/or ripples in cover |
| 3 | Moderate amount of material lifted from ball surface, but still attached to ball |
| 4 | Material removed or barely attached |

The balls that were tested were primed and top coated.

Cut Resistance

Cut resistance was measured in accordance with the following procedure. A golf ball was fired at 135 feet per second against the leading edge of a 1994 Top-Flite Tour pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. A 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

Durability

Figure 6:
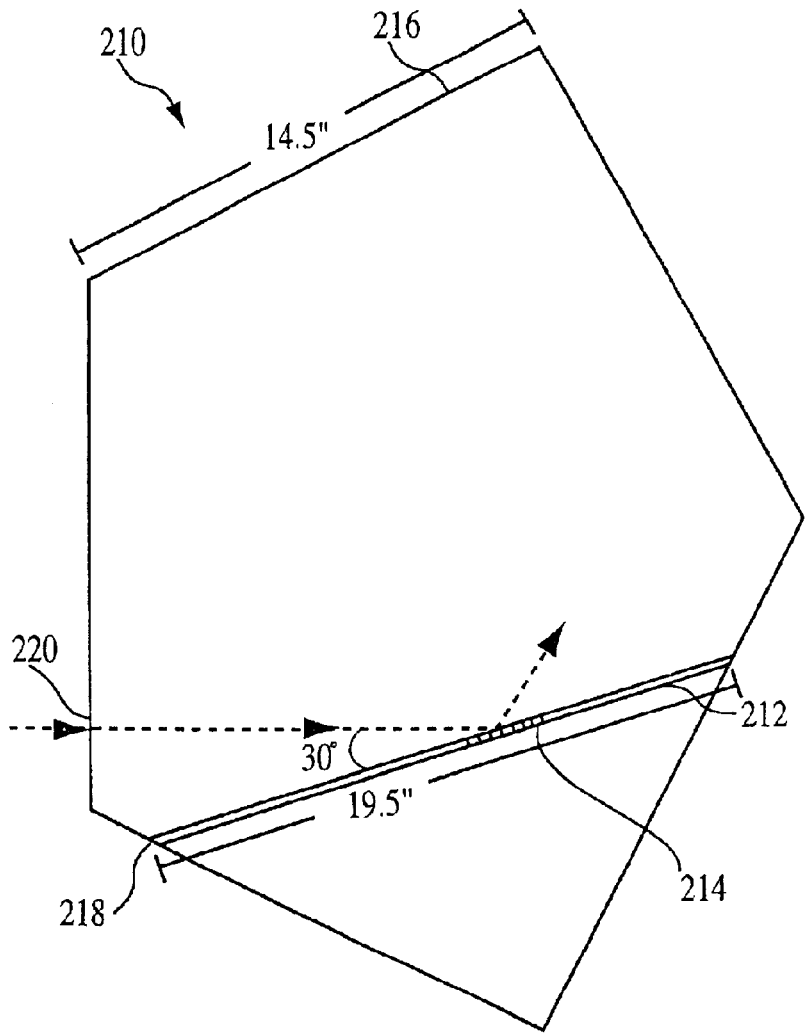
FIG. 6 is a schematic illustration of a hitting chamber used to conduct durability tests.
Figure 7:
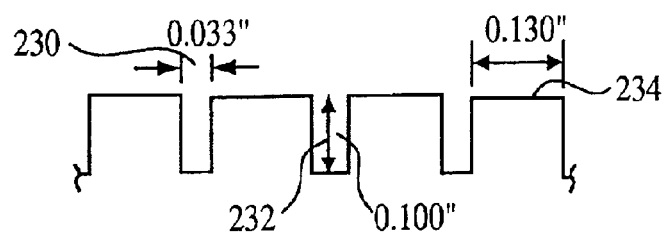
FIG. 7 is a detailed view of a portion of an insert plate used in the hitting chamber shown in FIG. 6, which contains a series of grooves that contact a golf ball.

Durability is determined by firing a golf ball at 135 ft/sec (at 72° F.) into 5-sided steel pentagonal container, the walls of which are steel plates. The container 210, which is shown schematically in FIG. 6, has a 19½ inch long insert plate 212 mounted therein, the central portion 214 of which has horizontally extending square grooves on it which are intended to simulate a square grooved face of a golf club. The grooves, which are shown in an exaggerated form in FIG. 7, have a width 230 of 0.033 inches, a depth 232 of 0.100 inches, and are spaced apart from one another by land areas 234 having a width of 0.130 inches. The five walls 216 of the pentagonal container each have a length of 14½ inches. The inlet wall is vertical and the insert plate is mounted such that it inclines upward 30° relative to a horizontal plane away from opening 220 in container 210. The ball travels 15½ to 15¾ inches horizontally from its point of entry into the container 210 until it hits the square-grooved central portion 214 of insert plate 212. The angle between the line of trajectory of the ball and the insert plate 212 is 30°. The balls are subjected to 70 or more blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected.

A ball is assigned a Durability Rating according to the following scale. A sample of twelve balls of the same type are obtained and are tested using the durability test apparatus previously described. If less than all of the balls in the sample survive 70 blows each without cracking, the ball is assigned a Durability Rating of 1. If all of the balls survive 70 blows and one or two of the twelve balls crack before 100 blows, the ball is assigned a Durability Rating of 2. If all twelve balls in the sample survive 100 blows each, but seven or more balls crack at less than 200 blows each, the ball is assigned a Durability Rating of 3. If all twelve balls in the sample survive 100 blows and at least six out of the twelve balls in the sample also survive 200 blows, the ball is assigned a Durability Rating of 4.

Shore D Hardness

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers.

The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125 +/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Compression

PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influence the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in a golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70 to 110, and preferably around 80 to 100.

In determining PGA compression using the 0 to 200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200 to 100) and a ball which deflects 0.110 inches (110×0.001 inches) has a PGA compression of 90 (i.e., 200 to 110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160—Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

The RIM process used in forming components of a multi-layered golf ball disclosed herein is substantially different from, and advantageous over, the conventional injection and compression molding techniques.

First, during the RIM process of the present application, the chemical reaction, i.e., the mixture of isocyanate from the isocyanate tank and polyol from the polyol tank, occurs during the molding process. Specifically, the mixing of the reactants occurs in the recirculation mix head and the after mixer, both of which are connected directly to the injection mold. The reactants are simultaneously mixed and injected into the mold, forming the desired component.

Typically, prior art techniques utilize mixing of reactants to occur before the molding process. Mixing under either compression or injection molding occurs in a mixer that is not connected to the molding apparatus. Thus, the reactants must first be mixed in a mixer separate from the molding apparatus, then added into the apparatus. Such a process causes the mixed reactants to first solidify, then later melt in order to properly mold.

Second, the RIM process requires lower temperatures and pressures during molding than does injection or compression molding. Under the RIM process, the molding temperature is maintained at about 100–120° F. in order to ensure proper injection viscosity. Compression molding is typically completed at a higher molding temperature of about 320° F. (160° C.). Injection molding is completed at even a higher temperature range of 392–482° F. (200–250° C.). Molding at a lower temperature is beneficial when, for example, the cover is molded over a very soft core so that the very soft core does not melt or decompose during the molding process.

Third, the RIM process creates more favorable durability properties in a golf ball than does conventional injection or compression molding. The preferred process of the present invention provides improved durability for a golf ball cover by providing a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials eliminates knit-lines and other molding deficiencies which can be caused by temperature difference and/or reaction difference in the injected materials. The RIM process of the present invention results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

Fourth, the RIM process is relatively faster than the conventional injection and compression molding techniques. In the RIM process, the chemical reaction takes place in under 5 minutes, typically in less than two minutes, preferably in under one minute and, in many cases, in about 30 seconds or less. The demolding time of the present application is 10 minutes or less. The molding process alone for the conventional methods typically take about 15 minutes. Thus, the overall speed of the RIM process makes it advantageous over the injection and compression molding methods.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

What is claimed is:

1. A process for making a golf ball, said process comprising:
    forming at least one of a cover and a core component of said golf ball by mixing two or more reactants together to produce a reaction product having (i) a flex modulus of from about 1 to about 310 Kpsi, and (ii) a reaction time of less than 2 minutes, wherein said at least one of said cover and said core component formed from said mixing operation has a thickness of at least about 0.01 inches.

2. The process according to claim 1, wherein said reaction product comprises at least one member selected from the group consisting of polyurethanes, polyureas, epoxies and unsaturated polyesters.

3. The process according to claim 1, wherein said reaction product comprises at least one member selected from the group consisting of polyurethane and polyurea.

4. The process according to claim 1, wherein said reaction product exhibits a reaction time of about 1 minute or less.

5. The process according to claim 4, wherein said reaction product exhibits a reaction time of 30 seconds or less.

6. The process according to claim 1, wherein said reaction product exhibits a demold time of 2 minutes or less.

7. The process according to claim 6, wherein said reaction product exhibits a demold of 1 minute or less.

8. The process according to claim 1, wherein said cover is formed from said process.

9. The process according to claim 8, wherein said cover is a dimpled cover layer and said cover has a thickness of at least 0.02 inches.

10. The process according to claim 8, wherein said cover has a hardness of 10 to 95 Shore D.

11. The process according to claim 8, wherein said cover has a hardness of 30 to 75 Shore D.

12. The process according to claim 1, wherein said core component is formed form said process.

13. The process according to claim 2, further including a step of recycling at least a portion of said reaction product.

14. The process according to claim 13, wherein said reaction product is recycled by glycolysis.

15. A multi-piece golf ball comprising a reaction injection molded material comprising polyurethane/polyurea, wherein said polyurethane/polyurea material includes meta-tetramethylxylylene diisocyanate.

* * * * *